US012676013B2

(12) United States Patent
Takahashi

(10) Patent No.: US 12,676,013 B2
(45) Date of Patent: Jul. 7, 2026

(54) DRIVER MONITORING DEVICE AND MONITORING PROGRAM

(71) Applicant: Yazaki Corporation, Tokyo (JP)

(72) Inventor: Yoshihiro Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 19/075,293

(22) Filed: Mar. 10, 2025

(65) Prior Publication Data

US 2025/0209833 A1 Jun. 26, 2025

Related U.S. Application Data

(63) Continuation of application No. PCT/JP2023/044729, filed on Dec. 13, 2023.

(30) Foreign Application Priority Data

Dec. 19, 2022 (JP) ................................. 2022-202280

(51) Int. Cl.
| | |
|---|---|
| *G06V 20/59* | (2022.01) |
| *G06V 40/16* | (2022.01) |
| *H04N 23/611* | (2023.01) |

(52) U.S. Cl.
CPC .......... *G06V 20/597* (2022.01); *G06V 40/168* (2022.01); *H04N 23/611* (2023.01)

(58) Field of Classification Search
CPC .... G06V 20/597; G06V 40/168; G06V 40/16; H04N 23/611; G06T 7/00; G06T 7/70; G08G 1/16

USPC .......................................................... 348/148
See application file for complete search history.

(56) References Cited

U.S. PATENT DOCUMENTS

| | | | | |
|---|---|---|---|---|
| 12,488,601 | B2 * | 12/2025 | Zhang .................. | G06V 20/597 |
| 12,505,683 | B1 * | 12/2025 | Carlsson .............. | G06V 20/597 |
| 12,541,982 | B2 * | 2/2026 | Esaki ...................... | G06V 20/58 |
| 2014/0055569 | A1 * | 2/2014 | Jeon ...................... | H04N 13/204 |
| | | | | 348/47 |
| 2019/0143993 | A1 * | 5/2019 | Aoi ...................... | G06V 20/597 |
| | | | | 340/439 |
| 2019/0144003 | A1 * | 5/2019 | Hyuga ................. | G06V 20/597 |
| | | | | 340/425.5 |

(Continued)

FOREIGN PATENT DOCUMENTS

| | | | | |
|---|---|---|---|---|
| JP | 2021-043637 A | 3/2021 | | |
| WO | WO-2022144963 A1 * | 7/2022 | ............... | G08G 1/00 |

*Primary Examiner* — Helen Shibru
(74) *Attorney, Agent, or Firm* — Banner & Witcoff, Ltd.

(57) ABSTRACT

A driver monitoring device includes: a camera (1) configured to capture an image of a driver of a vehicle and surroundings of the driver; a camera (2) having a narrow image capturing range and configured to capture an image of a feature of a face of the driver; a control unit configured to control image capturing timings of the cameras; and a determination unit configured to determine whether the driver is performing an operation unrelated to driving based on the acquired images. When an inattention of the driver is detected based on the image input from the camera (2) in a state in which an input from the camera (1) is stopped, the determination unit starts acquiring the image from the camera (1) and determines whether a detection target or a posture of the driver to be detected is included in the image captured by the camera (1).

4 Claims, 8 Drawing Sheets

(56)         References Cited

U.S. PATENT DOCUMENTS

| | | | |
|---|---|---|---|
| 2023/0166661 A1* | 6/2023 | Hung | G01S 13/867 |
| | | | 348/148 |
| 2025/0128703 A1* | 4/2025 | Takahashi | B60W 30/09 |
| 2025/0128716 A1* | 4/2025 | Takahashi | G06V 20/597 |
| 2025/0381975 A1* | 12/2025 | Julian | B60W 50/14 |

* cited by examiner (FIG. 4 CONTINUED)
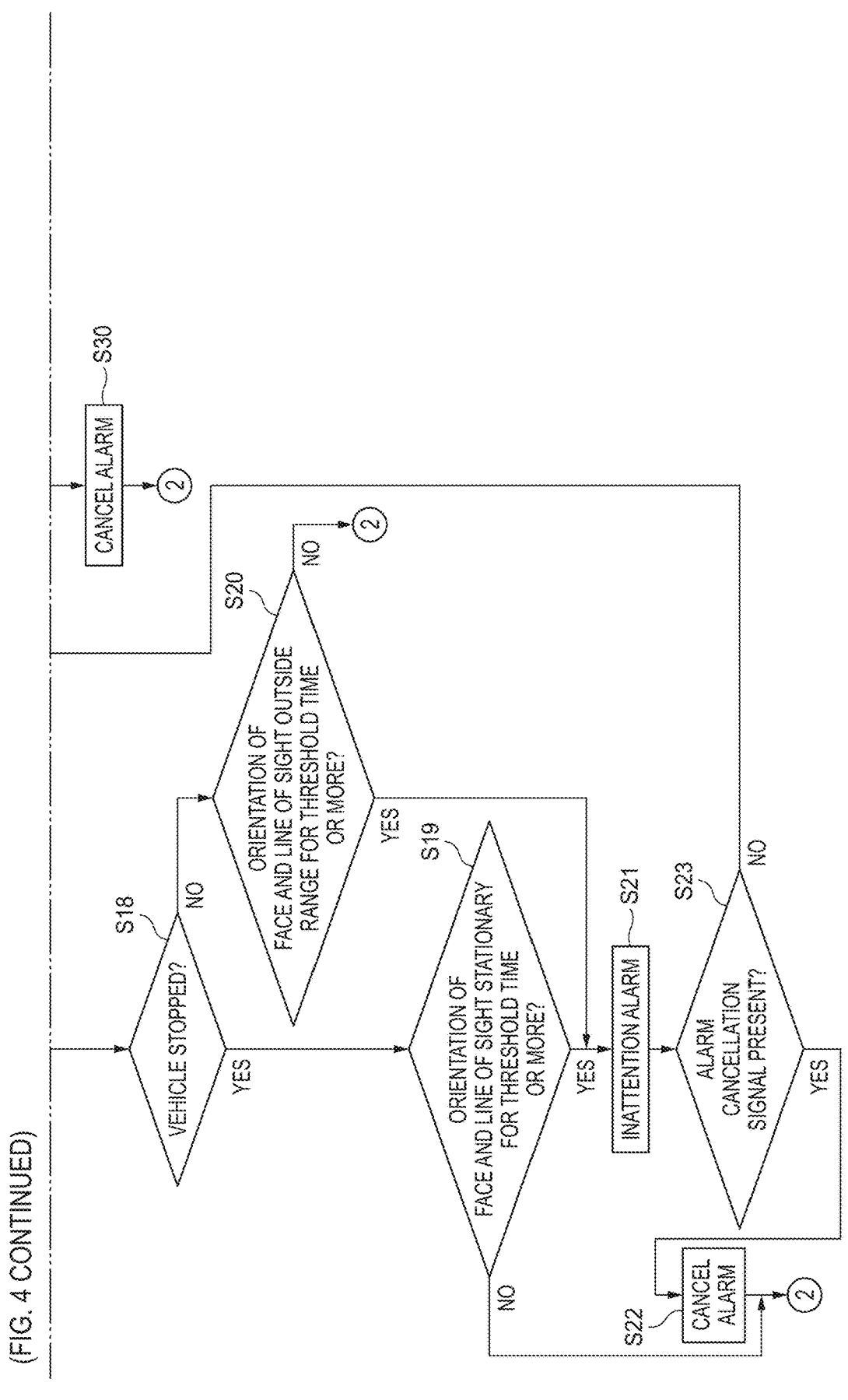

DRIVER MONITORING DEVICE AND MONITORING PROGRAM

CROSS-REFERENCE TO RELATED APPLICATIONS

This is a continuation of International Application No. PCT/JP2023/044729 filed on Dec. 13, 2023, and claims priority from Japanese Patent Application No. 2022-202280 filed on Dec. 19, 2022, the entire content of which is incorporated herein by reference.

TECHNICAL FIELD

The present invention relates to a driver monitoring device and a monitoring program.

BACKGROUND ART

In recent years, there is a situation in which, for example, due to an amendment to a road traffic act, a new obligation is imposed on a driver of a vehicle and the number of new devices that must be mounted on the vehicle increases. For example, a safe driving obligation is imposed on the driver during autonomous driving of the vehicle, and thus it is highly necessary for a system on the vehicle to correctly recognize a driving situation of the driver to support safe driving of the driver, and correctly record an actual situation of the safe driving.

For example, Patent Literature 1 discloses a driver monitoring device capable of detecting a dangerous driving element outside an image capturing range of a camera. Specifically, it is described in Patent Literature 1 that inattentive driving is detected by determining an orientation or the like of a face of a driver based on a luminance distribution on the face, and the inattentive driving, drowsy driving, or the like is determined based on a position of a pupil, movement of the pupil, or the like. In addition, it is described in Patent Literature 1 that a smartphone and the like reflected in the pupil on the face or eyeglasses (glasses) can be detected.

CITATION LIST

Patent Literature

Patent Literature 1: JP2021-43637A

SUMMARY OF INVENTION

Technical Problem

When an in-vehicle system monitors a situation of a driver during driving, a basic function of detecting drowsy driving, inattentive driving, an abnormal posture, and the like is required. Accordingly, it is necessary for the in-vehicle system to accurately grasp information on details of an eye or a face of the driver. For example, a function of detecting a dangerous driving situation such as a case in which the driver is performing distracted driving while operating a smartphone is also required for the in-vehicle system.

However, in order to implement the functions described above, it is necessary to monitor a state of a detail by constantly capturing, using a camera having a high resolution, an image in a wide range including a body of a driver who is sitting in a driver seat from a location where a blind spot is unlikely to occur and constantly performing data processing on the captured image, regardless of an actual driving situation. Therefore, a load of a processing device that performs processing on image data and the like becomes large, and there is a concern that a power consumption increases and a heat generation amount increases.

Since the load of the processing device becomes large, the processing device is in a state in which most of resources of the processing device are constantly consumed, and a situation is conceivable in which the resources of the processing device cannot be used for a purpose other than monitoring the driver. Accordingly, it is difficult to perform a design change such as adding a new function to the existing processing device.

The present invention has been made in view of the circumstances described above, and an object of the present invention is to provide a driver monitoring device and a monitoring program capable of appropriately monitoring a driver in various situations and reducing a load of a processing device that processes data such as an image.

Solution to Problem

The object of the present invention is implemented by the following configuration.

A driver monitoring device includes:

a first image capturing unit configured to be capable of capturing an image of a driver of a vehicle and surroundings of the driver;

a second image capturing unit having an image capturing range narrower than an image capturing range of the first image capturing unit and configured to be capable of capturing an image of a feature appearing on a face of the driver;

a control unit configured to control image capturing timings of the first image capturing unit and the second image capturing unit; and a determination unit configured to determine whether the driver is performing at least an operation unrelated to a driving operation based on the images acquired from the first image capturing unit and the second image capturing unit, in which when it is detected that the driver is inattentive based on the image input from the second image capturing unit in a state in which an input from the first image capturing unit is stopped, the determination unit controls the control unit to start acquiring the image from the first image capturing unit, and determines whether a detection target or a posture of the driver to be detected is included in the image acquired from the first image capturing unit.

A monitoring program executable by a computer of a monitoring device, the monitoring device including a first image capturing unit configured to be capable of capturing an image of a driver of a vehicle and surroundings of the driver, a second image capturing unit having an image capturing range narrower than an image capturing range of the first image capturing unit and configured to be capable of capturing an image of a feature appearing on a face of the driver, a control unit configured to control image capturing timings of the first image capturing unit and the second image capturing unit, and a determination unit configured to determine whether the driver is performing at least an operation unrelated to a driving operation based on the images acquired from the first image capturing unit and the second image capturing unit, the monitoring program comprising:

a procedure of detecting that the driver is inattentive based on a second image input from the second image capturing unit; and a procedure of starting acquiring a first image from the first image capturing unit and determining whether a detection target or a posture of the driver to be detected is included in the first image when it is detected that the driver is inattentive based on the second image in a state in which an input from the first image capturing unit is stopped.

Advantageous Effects of Invention

According to the driver monitoring device and the monitoring program according to the present invention, it is possible to appropriately monitor various situations of a driver and to reduce a load of a processing device that processes data such as an image.

The present invention has been briefly described above. Further, details of the present invention can be clarified by reading a mode (hereinafter, referred to as "embodiment") for carrying out the invention to be described below with reference to the accompanying drawings.

DESCRIPTION OF EMBODIMENTS

A specific embodiment of the present invention will be described below with reference to the drawings.

Figure 1:
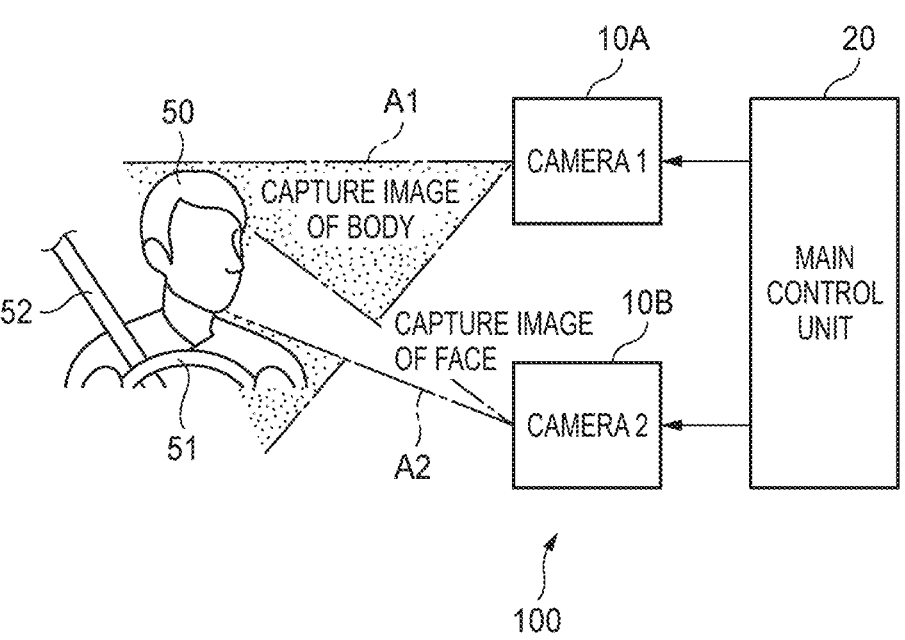
FIG. 1 is a block diagram showing a schematic configuration of a driver monitoring device according to an embodiment of the present invention.

FIG. 1 is a block diagram showing a schematic configuration of a driver monitoring device 100 according to an embodiment of the present invention.

The driver monitoring device 100 shown in FIG. 1 includes a first camera (camera 1) 10A, a second camera (camera 2) 10B, and a main control unit 20.

An installation position and an angle of view of the first camera 10A are adjusted in advance such that the first camera 10A can capture an image in an image capturing range A1 in FIG. 1. That is, the first camera 10A can capture an image in a relatively wide range including a face, an upper half body of a body, an arm, a hand, and the like of a driver 50 who is sitting in a driver seat.

For example, the first camera 10A is installed in a portion of any one of an overhead module, a rear-view mirror, a center portion of an instrument panel, a pillar, a meter hood, an inside of a meter, a steering column, and the like in a vehicle compartment of a vehicle.

The image capturing range A1 includes a region in which in-vehicle devices such as a steering wheel 51 and a seat belt 52 of the vehicle are present.

An installation position and an angle of view of the second camera 10B are adjusted in advance such that the second camera 10B can capture an image in an image capturing range A2 in FIG. 1. That is, the second camera 10B can capture an image in only a range that is relatively narrower than that of the first camera 10A such that detailed information on a portion of the face of the driver 50 who is sitting in the driver seat can be captured.

The installation position of the second camera 10B may be a location that is the same as that of the first camera 10A, but it is desirable to dispose the second camera 10B at a position where the image can be captured from a front side of the driver 50 so as to more easily acquire information such as a line of sight.

The main control unit 20 is an electronic control unit (ECU) having a function of monitoring a situation of the driver based on images captured by the first camera 10A and the second camera 10B. The main control unit 20 can control, for each of the first camera 10A and the second camera 10B, a timing of capturing an image, a timing of acquiring image data, exposure, a gain, and the like. The main control unit 20 processes the image data acquired from at least one of the first camera 10A and the second camera 10B to acquire information indicating a driving situation, automatically records and stores the resulting information, and performs output of an alarm and the like depending on the situation in order to support safe driving.

<Examples of Captured Images>

Figure 2:
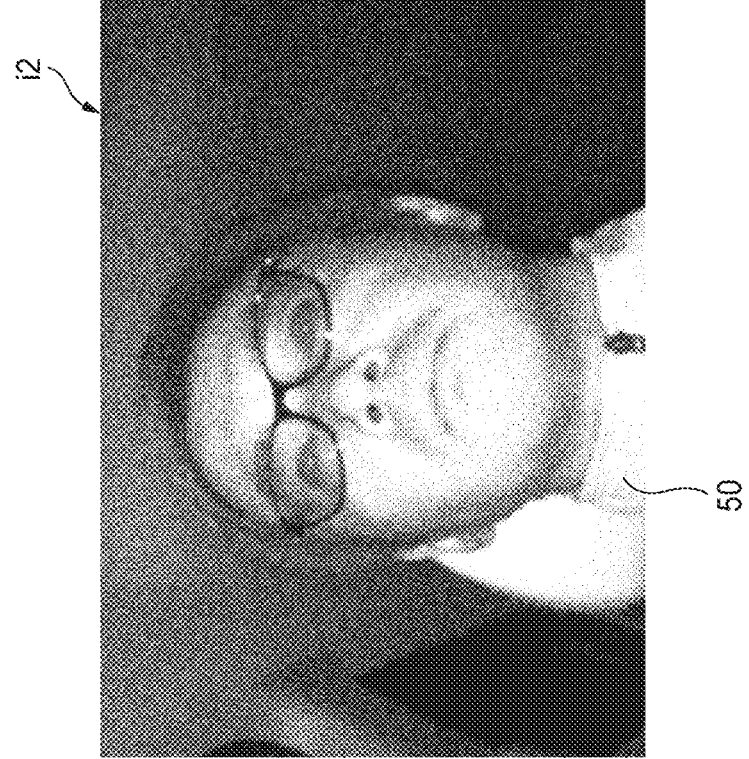
FIG. 2 is a front view showing examples of two types of captured images captured by two cameras.
Figure 2:
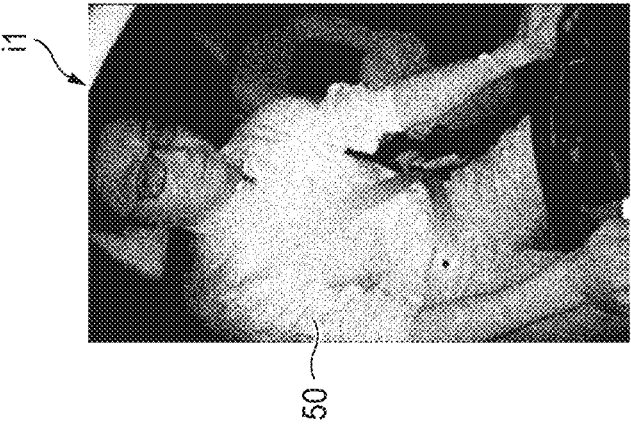

FIG. 2 shows specific examples of two types of captured images i1 and i2 captured by the first camera 10A and the second camera 10B, respectively.

In the captured image i1 shown in FIG. 2, information on the upper half body of the body, both hands, both arms, and the like of the driver 50 which is sufficient for grasping the driving situation is depicted. In the captured image i2 shown in FIG. 2, information including the entire face and a head of the driver 50 is depicted in an enlarged state.

Therefore, for example, by analyzing data of an image such as the captured image i2 by the main control unit 20, it is possible to detect an orientation of the face and a direction of the line of sight of eyes of the driver 50, and to monitor a change therein. In addition, by analyzing data of an image such as the captured image i1 by the main control unit 20, it is also possible to detect a situation in which the driver 50 is holding the steering wheel or detect a mobile terminal (such as a smartphone) that may be held by the driver 50 in his or her hand.

<Main Functional Configuration>

Figure 3:
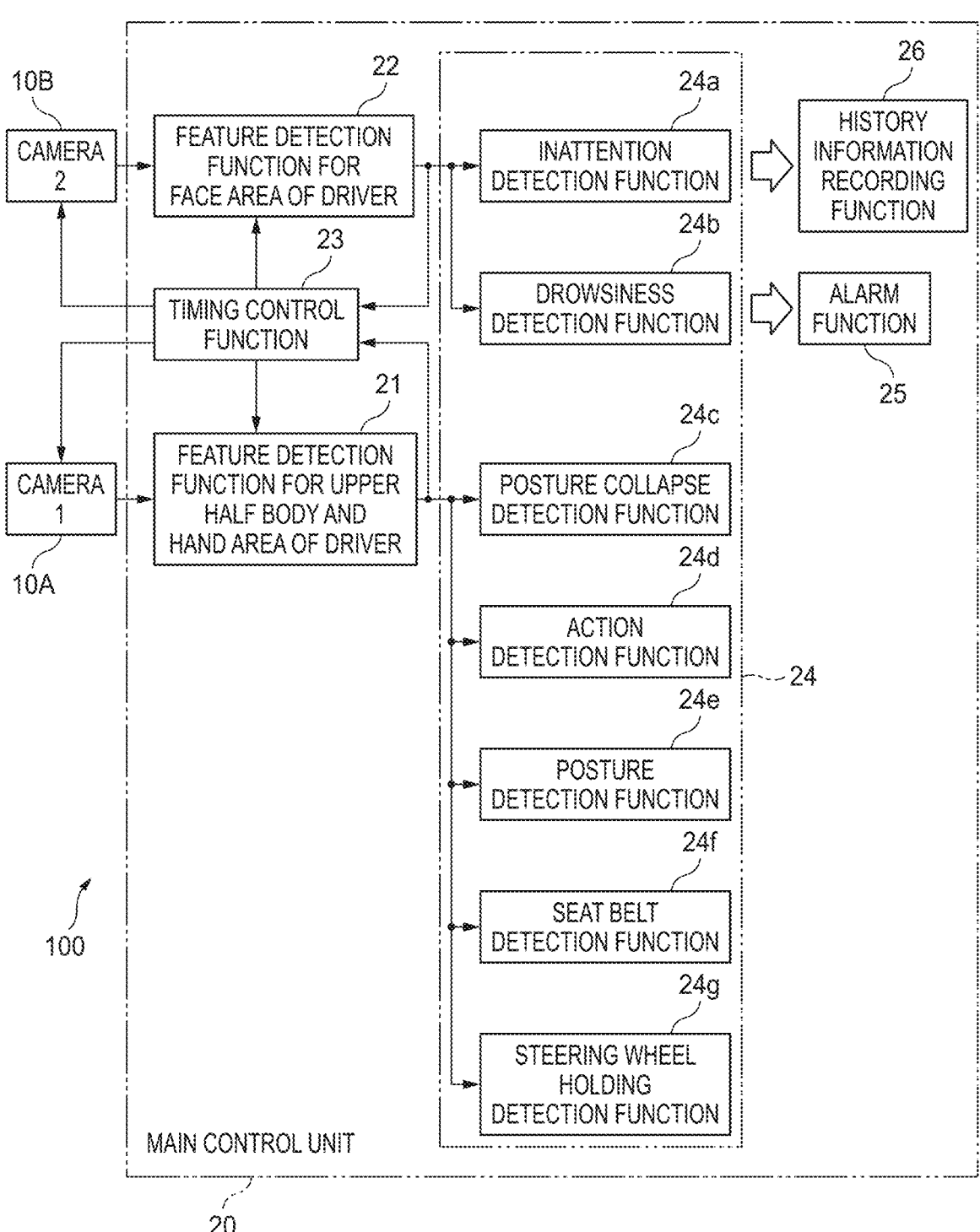
FIG. 3 is a block diagram showing a configuration of main functions mounted on the driver monitoring device in FIG. 1.

FIG. 3 is a block diagram showing a configuration of main functions mounted on the driver monitoring device 100 in FIG. 1.

Each of functions of the main control unit 20 shown in FIG. 3 is implemented by, for example, an operation of hardware of an electronic circuit that mainly includes a microcomputer (not shown) incorporated in the main control unit 20 and a program executed by the microcomputer.

The main control unit 20 includes feature detection functions 21 and 22, a timing control function 23, a monitoring function unit 24, an alarm function 25, and a history information recording function 26. The monitoring function unit 24 includes an inattention detection function 24a, a drowsiness detection function 24b, a posture collapse detection function 24c, an action detection function 24d, a posture detection function 24e, a seat belt detection function 24f, and a steering wheel holding detection function 24g.

The feature detection function 21 detects various features of each part of the upper half body and a hand region of the driver 50 by performing image processing on the image data acquired from the first camera 10A. The feature detection function 22 detects various features of a face region of the driver 50 by performing image processing on the image data acquired from the second camera 10B.

The timing control function 23 controls, based on a detection state of each of the feature detection functions 21 and 22, a timing at which each of the first camera 10A and the second camera 10B performs image capturing (including control for illumination light), a timing at which each of the first camera 10A and the second camera 10B transmits the captured image data to the main control unit 20 (or a timing at which the main control unit 20 requests the image), and the like.

The monitoring function unit 24 detects a current state of each of various monitoring target items required in the vehicle.

The inattention detection function 24a has a function of detecting, based on information on the face of the driver 50, whether the driver 50 is driving in a state of facing a direction that has no relation with the driving.

The drowsiness detection function 24b has a function of detecting, based on the information on the face of the driver 50, whether the driver 50 is driving in a state in which the eyes of the driver 50 are closed or in a drowsy state.

The posture collapse detection function 24c has a function of detecting, based on information on the upper half body of the body and the like of the driver 50, whether the driver 50 is driving in an abnormal posture different from a normal driving posture.

The action detection function 24d has a function of detecting, based on the information on the upper half body of the body and the like of the driver 50, whether the driver 50 is performing a dangerous distracted driving action such as operating a smartphone.

The posture detection function 24e has a function of detecting information such as a posture of the whole body of the driver 50, an orientation in a horizontal direction and a front-back direction of the face, the direction of the line of sight, inclination of an upper body, and the like.

The seat belt detection function 24f has a function of detecting whether the driver 50 is wearing the seat belt.

The steering wheel holding detection function 24g has a function of detecting whether the driver 50 is holding the steering wheel in a state in which the driver 50 can drive.

The alarm function 25 has a function of supporting the safe driving of the driver 50 by notifying the driver 50 of an abnormality, for example, by outputting a voice or an alarm sound when any function of the monitoring function unit 24 detects a situation that should be warned regarding a driving state of the driver.

The history information recording function 26 records and stores, in a predetermined non-volatile recording medium as history information, the information detected by each of the functions of the monitoring function unit 24 regarding the driving state of the driver 50 in association with, for example, a current time and information on a current position of the vehicle.

<Operation of Main Control Unit>

Figure 4:
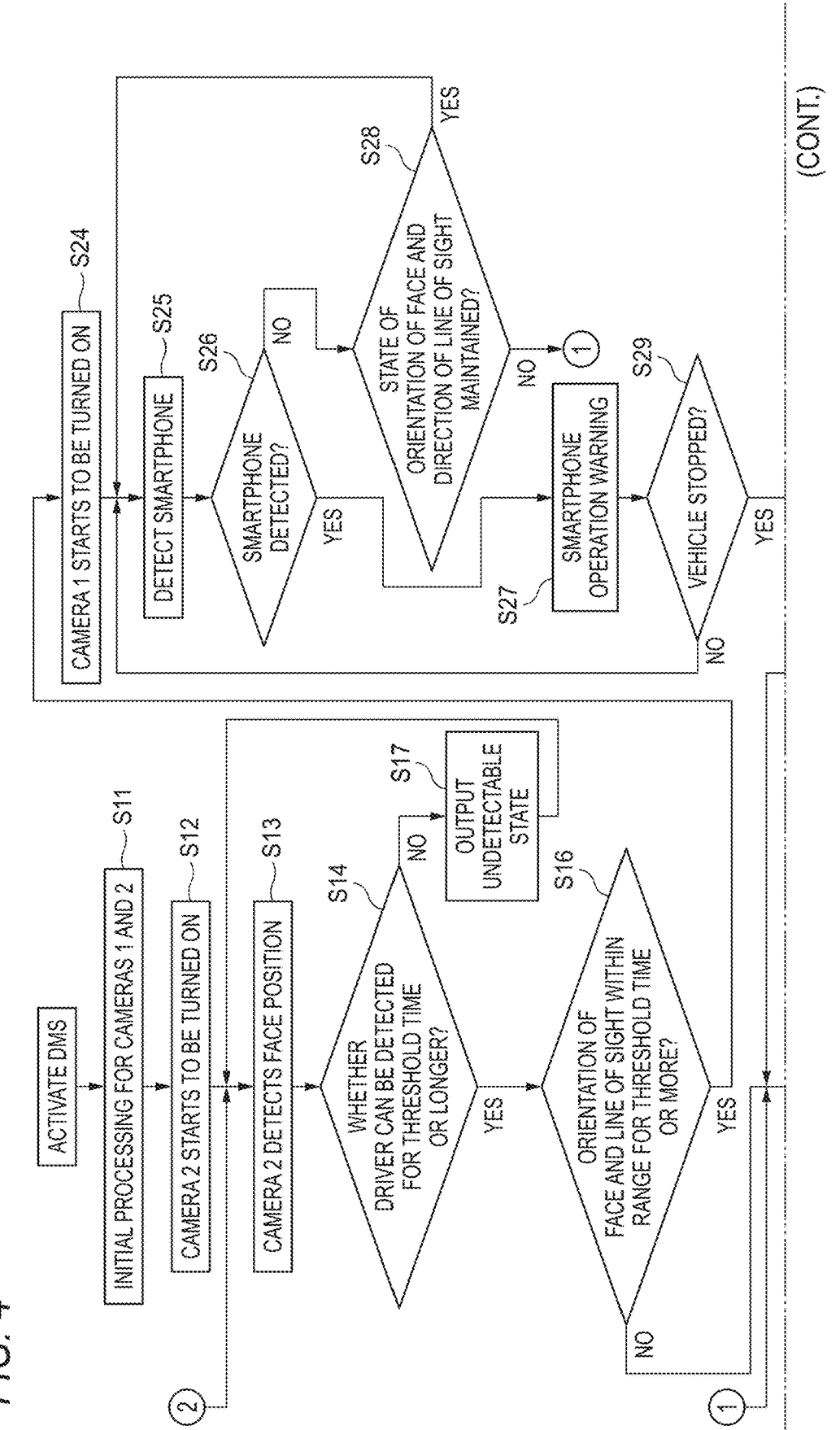
FIG. 4 is a flowchart showing an operation example of a main control unit.

An operation example of the main control unit 20 is shown in FIG. 4. That is, the computer of the main control unit 20 starts an operation shown in FIG. 4 when a driver monitoring system (DMS) of the vehicle is activated. The operation shown in FIG. 4 will be described below.

As an initialization process of each of the first camera 10A and the second camera 10B, the main control unit 20 automatically adjusts the exposure of each camera and a gain of a video processing circuit so as to be appropriate, and records information indicating a state of each of the first camera 10A and the second camera 10B (S11). In the initial state, illumination of each camera is turned off.

In the present embodiment, the main control unit 20 normally processes only the image captured by the second camera 10B to monitor the driver 50. Therefore, first, only LED illumination built in or attached to the second camera 10B starts to be turned on (S12). Brightness of the image captured by the second camera 10B is detected, and a brightness variation amount generated during a certain time is recorded. An emission wavelength of the LED illumination is in a near-infrared region such that the camera can capture an image even at night.

The main control unit 20 periodically acquires the image data that is obtained by capturing the image by the second camera 10B, processes the image data by the feature detection function 22, and periodically and repeatedly executes detection processing for a face position of the driver 50 (S13).

The main control unit 20 compares a length of time during which the face position of the driver 50 can be detected with a predetermined threshold time (S14). If the length of time during which the face position can be detected is equal to or longer than the threshold time, the processing proceeds to S16. If the condition in S14 is not satisfied, the processing proceeds to S17, and the main control unit 20 outputs information indicating that the face of the driver 50 cannot be detected.

The main control unit 20 compares both the orientation of the face and the direction of the line of sight of the driver 50 with a predetermined specific range (S16). The specific range corresponds to a range of the orientation of the face and the direction of the line of sight assumed in a case in which the driver 50 gazes at a screen of a mobile terminal such as a smartphone, a case in which the driver 50 operates the mobile terminal with his or her hand, or a situation in which the driver 50 performs an operation such as a phone call on the mobile terminal. If the condition in S16 is satisfied, the processing proceeds to S24.

When the condition in S16 is not satisfied, the main control unit 20 identifies whether the vehicle is stopped in S18. Further, if the vehicle is stopped, the processing proceeds to S19, and it is identified whether both the orientation of the face and the direction of the line of sight of the driver 50 remain stationary for the predetermined threshold time or more. If the vehicle is not stopped, the processing proceeds to S20, and it is identified whether a time during which both the orientation of the face and the direction of the line of sight of the driver 50 are outside the predetermined range continues for the threshold time or more.

The processing performed by the main control unit 20 proceeds to S21 if the vehicle is stopped and the condition in S19 is satisfied, and proceeds to S13 if the condition in S19 is not satisfied. The processing proceeds to S21 if the vehicle is not stopped and the condition in S20 is satisfied, and proceeds to S13 if the condition in S19 is not satisfied.

The main control unit 20 outputs an inattention alarm for the driver in S21. Further, presence or absence of a predetermined alarm cancellation signal is identified in S22. If the alarm cancellation signal is detected, the alarm in S21 is cancelled in the next S23, and then the processing proceeds to S13. If the alarm cancellation signal is not detected, the processing proceeds to S18. For example, the alarm cancellation signal for inattention can be generated by a predetermined button operation performed by the driver.

In contrast, if the condition in S16 is satisfied, the main control unit 20 starts turning on the LED illumination built in or attached to the first camera 10A in S24 such that the first camera 10A can start capturing the image. The main control unit 20 reflects the brightness variation amount of the second camera 10B detected in S12 in the setting values of the exposure and the gain in the first camera 10A.

The main control unit 20 periodically acquires the image data that is obtained by capturing the image by the first camera 10A, processes the image data by the feature detection function 21, and periodically and repeatedly executes detection processing for a mobile terminal such as a smartphone that may be held by the driver 50 in his or her hand (S25).

For example, when a position of the hand of the driver 50 is detected and tracked and a contour shape or the like the same as that of the smartphone is detected in a rectangular region in the vicinity of the hand in the image to be processed, it can be regarded that the smartphone is detected. Alternatively, in a case in which the hand is present on a side of the face of the driver 50 and a contour shape or the like the same as that of the smartphone is detected in a rectangular region in the vicinity of the hand as in a case in which the driver 50 is making a phone call, it can be regarded that the smartphone is detected.

In a case in which the smartphone is detected based on the image captured by the first camera 10A, the main control unit 20 generates a distracted driving warning related to a smartphone operation in S27. Further, whether the vehicle is stopped is identified in S29. If the vehicle is not stopped, the processing returns to S25, and if the vehicle is stopped, the distracted driving warning is cancelled (S30).

In contrast, if the smartphone is not detected in S26, the processing performed by the main control unit 20 proceeds to S28. It is identified whether both the orientation of the face and the direction of the line of sight of the driver 50 are maintained in a constant state. If the orientation of the face and the direction of the line of sight are constant, the processing returns to S25, and if the orientation of the face and the direction of the line of sight change, the processing proceeds to S18.

When the main control unit 20 is executing the processing of S24 to S30 in FIG. 4, the image data captured by the second camera 10B is unnecessary, and thus a content of the processing may be changed such that the illumination of the second camera 10B is temporarily turned off and the image capturing operation performed by the second camera 10B or transmission of the image data is stopped.

<Operation Timing of Device>

Example 1

Figure 5:
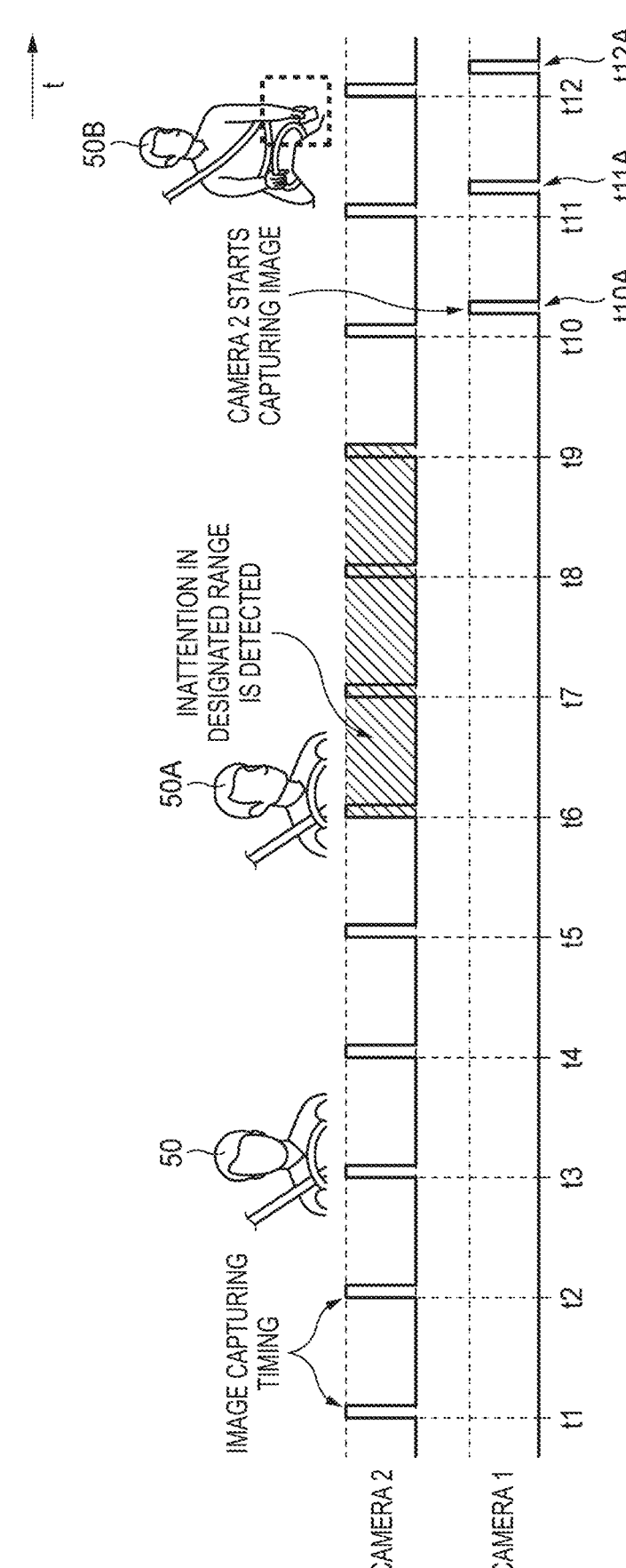
FIG. 5 is a time chart showing an example 1 of operation timings in the driver monitoring device in FIG. 1.

FIG. 5 shows an example 1 of operation timings in the driver monitoring device 100 in FIG. 1. An operation shown in FIG. 5 will be described below.

In the operation shown in FIG. 5, the driver monitoring device 100 normally uses only the second camera 10B to repeatedly capture images at a constant period, that is, at times t1, t2, t3, t4, . . . in FIG. 5, and processes the image each time to recognize a driving state of the driver 50.

When a state in which an inattentive state in a designated range is detected continues for a certain time or more (in a range from time t6 to time t9) as in a case of a driver 50A shown in FIG. 5, the main control unit 20 determines that there is a possibility of distracted driving and starts processing for detecting a smartphone. That is, image capturing performed by the first camera 10A is started from time t10A, and the image capturing is repeated at times t11A, t12A, . . . at regular time intervals.

Based on the images captured by the first camera 10A at the times t10A, t11A, t12A, . . . , the main control unit 20 extracts a rectangular region in the vicinity of the hand as in a case of a driver 50B in FIG. 5, and detects whether the smartphone is present in the rectangular region (corresponding to S25 and S26 in FIG. 4).

In the operation shown in FIG. 5, the times t10, t11, t12, . . . at which the second camera 10B captures images and the times t11A, t12A, . . . at which the first camera 10A captures images are asynchronous and are shifted from each other such that the timings do not overlap.

Example 2

Figure 6:
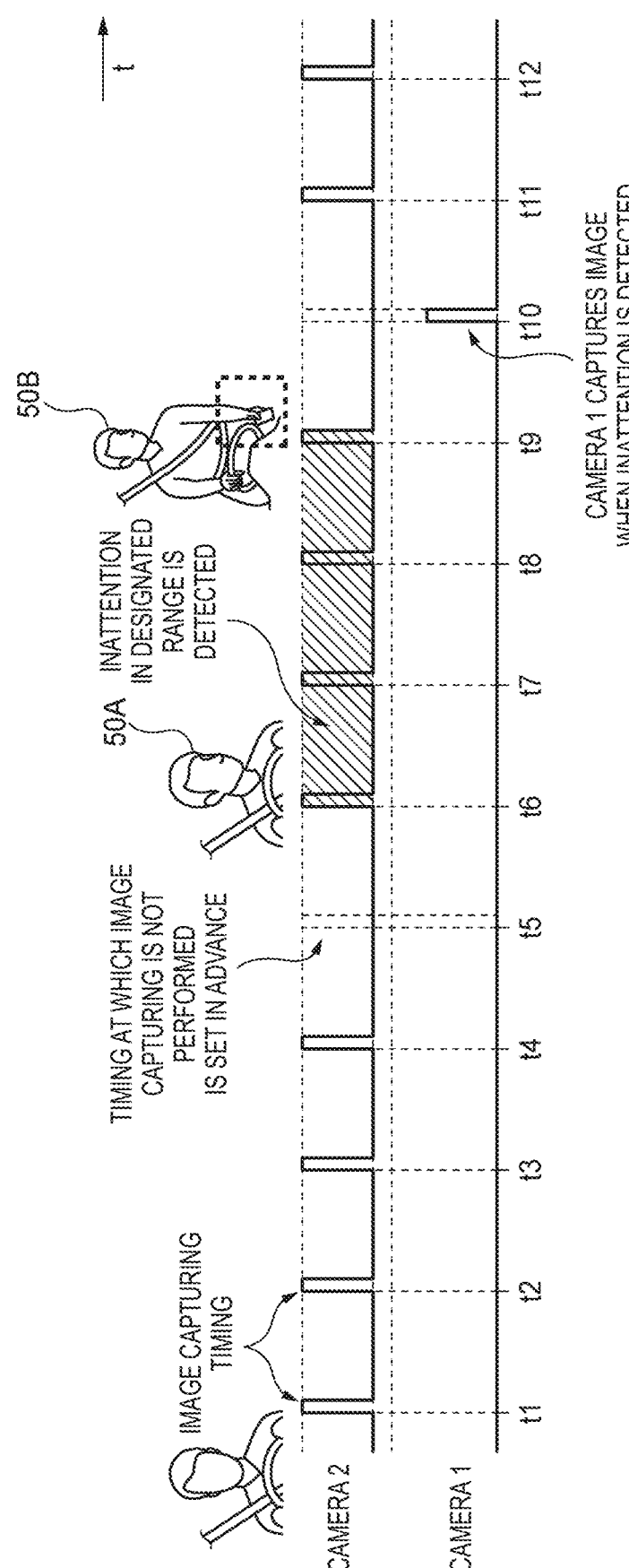
FIG. 6 is a time chart showing an example 2 of operation timings in the driver monitoring device in FIG. 1.

FIG. 6 shows an example 2 of operation timings in the driver monitoring device 100 in FIG. 1. An operation shown in FIG. 6 will be described below.

In the operation shown in FIG. 6, the driver monitoring device 100 normally uses only the second camera 10B to repeatedly capture images at the constant period, that is, at the times t1, t2, t3, . . . in FIG. 6, but timings (time t5, t10, . . . ) at which the second camera 10B does not capture the images are predetermined.

The main control unit 20 processes the images each time captured by the second camera 10B at the times t1, t2, t3, . . . to recognize the driving state of the driver 50.

When a state in which an inattentive state in a designated range is detected continues for a certain time or more (in the range from the time t6 to the time t9) as in a case of the driver 50A shown in FIG. 6, the main control unit 20 determines that there is a possibility of distracted driving and performs processing for detecting the smartphone. That is, the first camera 10A captures an image at the time t10, and based on the image captured by the first camera 10A, the main control unit 20 extracts a rectangular region in the vicinity of the hand as in a case of the driver 50B in FIG. 6, and detects whether the smartphone is present in the rectangular region (corresponding to S25 and S26 in FIG. 4).

Example 3

Figure 7:
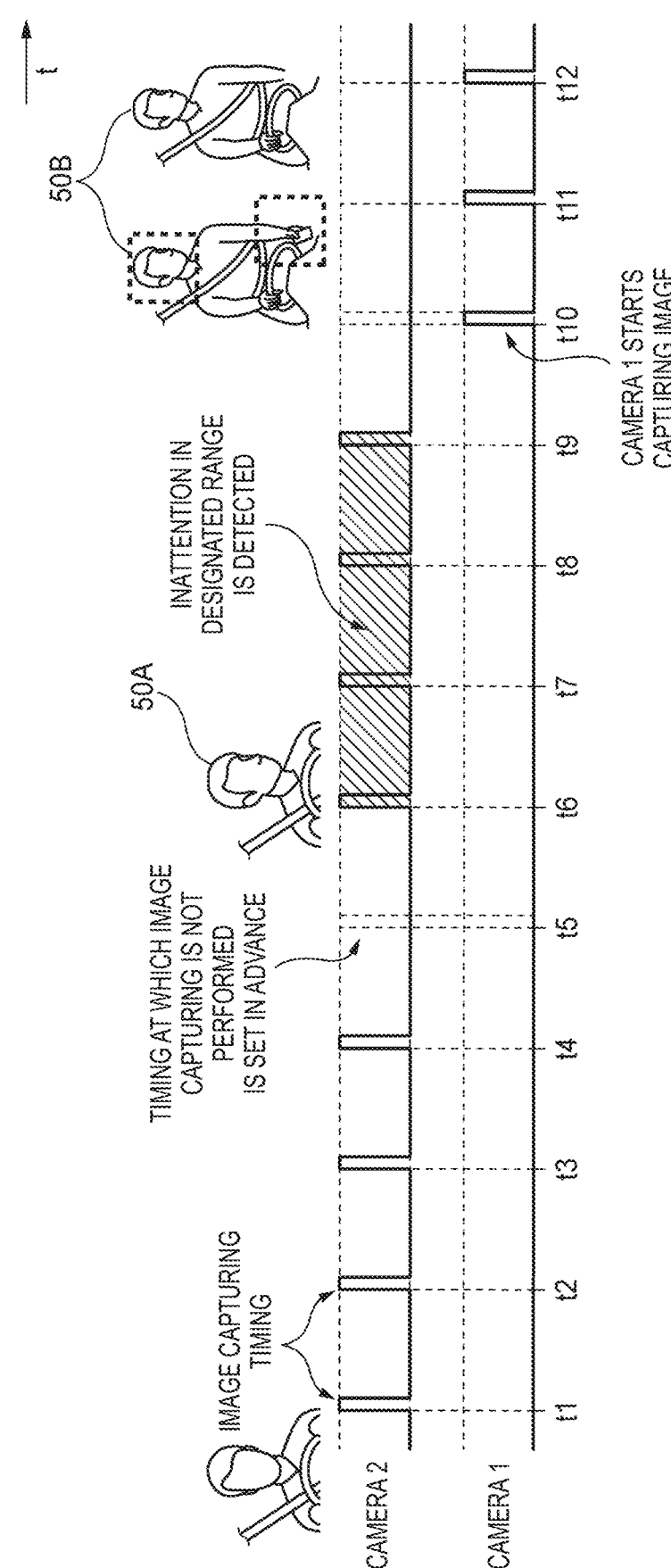
FIG. 7 is a time chart showing an example 3 of operation timings in the driver monitoring device in FIG. 1.

FIG. 7 shows an example 3 of operation timings in the driver monitoring device 100 in FIG. 1. An operation shown in FIG. 7 will be described below.

In the operation shown in FIG. 7, the driver monitoring device 100 normally uses only the second camera 10B to repeatedly capture images at the constant period, that is, at the times t1, t2, t3, . . . in FIG. 7, but timings (time t5, t10, . . . ) at which the second camera 10B does not capture the images are predetermined.

The main control unit 20 processes the images each time captured by the second camera 10B at the times t1, t2, t3, . . . to recognize the driving state of the driver 50.

When a state in which an inattentive state in a designated range is detected continues for a certain time or more (in a range from the time t6 to the time t9) as in the case of the driver 50A shown in FIG. 7, the main control unit 20 determines that there is a possibility of distracted driving and starts processing for detecting a smartphone. That is, the image capturing performed by the first camera 10A is started from the time t10, and the image capturing is repeated at times t10, t11, t12, . . . predetermined at regular time intervals.

The image capturing performed by the second camera 10B is stopped at the timings (t11, t12, . . . ) after the first camera 10A starts capturing the image such that the timing at which the first camera 10A captures the image and the timing at which the second camera 10B captures the image do not overlap each other.

Based on the images captured by the first camera 10A at times t10, t11, t12, . . . , the main control unit 20 extracts a rectangular region in the vicinity of the hand as in a case of the driver 50B in FIG. 7, and detects whether the smartphone is present in the rectangular region (corresponding to S25 and S26 in FIG. 4).

As described above, in the driver monitoring device 100 according to the present embodiment, the main control unit 20 normally processes only the images captured by the second camera 10B at the times t1 to t9 in FIGS. 5 to 7, and thus it is possible to reduce a processing load in the main control unit 20. In particular, since the second camera 10B has a narrow image capturing range, it is possible to sufficiently detect the orientation of the face and the direction of the line of sight even in an image having a low resolution, which is effective in reducing the processing load. When an inattention of the driver 50 is detected, an image obtained by capturing a wide range using the first camera 10A is set as a processing target, and thus it is easy to detect a smartphone or the like held by the driver 50 in his or her hand, and the distracted driving situation can be correctly detected. The processing load of the main control unit 20 can be reduced by stopping the image capturing and processing performed by the second camera 10B at the timing of processing the image captured by the first camera 10A as shown in FIGS. 5 to 7.

The present invention is not limited to the above embodiment, and modifications, improvements, or the like can be made as appropriate. In addition, materials, shapes, sizes, numbers, arrangement positions, and the like of components in the embodiment described above are freely selected and are not limited as long as the present invention can be implemented.

Here, the features of the driver monitoring device and the monitoring program according to the embodiment of the present invention described above are briefly summarized and listed in the following [1] to [5].

[1] A driver monitoring device (100) including:
a first image capturing unit (first camera 10A) configured to be capable of capturing an image of a driver of a vehicle and surroundings of the driver;
a second image capturing unit (second camera 10B) having an image capturing range narrower than an image capturing range of the first image capturing unit and configured to be capable of capturing an image of a feature appearing on a face of the driver;
a control unit (main control unit 20, timing control function 23) configured to control image capturing timings of the first image capturing unit and the second image capturing unit; and
a determination unit (main control unit 20, action detection function 24d) configured to determine whether the driver is performing an operation unrelated to a driving operation based on the images acquired from the first image capturing unit and the second image capturing unit, in which
when it is detected that the driver is inattentive based on the image input from the second image capturing unit in a state in which an input from the first image capturing unit is stopped, the determination unit controls the control unit to start acquiring the image from the first image capturing unit (S24, S25), and determines whether a detection target or a posture of the driver to be detected is included in the image acquired from the first image capturing unit (S26).

According to the driver monitoring device having the configuration of the above [1], it is possible to easily detect a situation such as distracted driving performed by a driver who drives a vehicle. That is, an inattentive driving situation can be easily detected by processing the image captured by the second image capturing unit that has the narrow image capturing range. By processing the image captured by the first image capturing unit in the inattentive driving situation, it is possible to detect a smartphone operated by the driver or detect a posture of the driver gazing at a screen of the smartphone. That is, it is possible to identify the distracted driving such as operating the smartphone in the inattentive driving situation. In addition, a processing load can be significantly reduced by appropriately adjusting the image capturing timings and processing timings of the first image capturing unit and the second image capturing unit. Accordingly, it is possible to reduce heat generation and an increase in power consumption of a control device, and to reduce resource consumption of the control device.

[2] The driver monitoring device according to [1], in which
the determination unit detects a mobile terminal present in a region in a vicinity of the driver based on the image captured by the first image capturing unit (S24 to S26).

According to the driver monitoring device having the configuration of the above [2], the mobile terminal is detected based on the image captured by the first image capturing unit that captures the image in a relatively wide range, and thus it is possible to easily detect the distracted driving even when the driver is holding and operating the mobile terminal in a place far away from the face of the driver.

[3] The driver monitoring device according to [1] or [2], in which
the determination unit detects at least one of an orientation of the face and a direction of a line of sight of the driver based on the image captured by the second image capturing unit (S12 to S16).

According to the driver monitoring device having the configuration of the above [3], the orientation of the face or the direction of the line of sight of the driver is detected, and thus it is possible to detect the inattentive driving situation of the driver, a situation in which the driver is gazing at the screen of the mobile terminal, and the like.

[4] The driver monitoring device according to [1], in which
the determination unit detects at least one of an orientation of the face and a direction of a line of sight of the driver based on the image captured by the second image capturing unit (S12 to S16), and determines that the driver is inattentive when the detected orientation of the face or direction of the line of sight is within a range of an inattention condition for a certain time or more (S16, S24).

According to the driver monitoring device having the configuration of the above [4], the orientation of the face or the direction of the line of sight of the driver is detected, and a length of time during which the same state continues is identified. Therefore, it is possible to more accurately detect the inattentive driving situation of the driver, the situation in which the driver is gazing at the screen or the like of the mobile terminal, and the like.

[5] A monitoring program executable by a computer (main control unit 20) of a monitoring device, the monitoring device including a first image capturing unit configured to be capable of capturing an image of a driver of a vehicle and surroundings of the driver, a second image capturing unit having an image capturing range narrower than an image capturing range of the first image capturing unit and configured to be capable of capturing an image of a feature appearing on a face of the driver, a control unit configured to control image capturing timings of the first image capturing unit and the second image capturing unit, and a determination unit configured to determine whether the driver is performing an operation unrelated to a driving operation based on the images acquired from the first image capturing unit and the second image capturing unit, the monitoring program including:

a procedure (S12 to S16) of detecting that the driver is inattentive based on a second image input from the second image capturing unit; and a procedure (S24 to S26) of starting acquiring a first image from the first image capturing unit and determining whether a detection target or a posture of the driver to be detected is included in the first image when it is detected that the driver is inattentive based on the second image in a state in which an input from the first image capturing unit is stopped.

By executing the monitoring program including the procedure of the above [5] by a predetermined computer, it is possible to easily detect a situation such as the distracted driving performed by the driver who drives the vehicle. That is, the inattentive driving situation can be easily detected by processing the image captured by the second image capturing unit that has the narrow image capturing range. By processing the image captured by the first image capturing unit in the inattentive driving situation, it is possible to detect the smartphone operated by the driver or detect the posture of the driver gazing at the screen of the smartphone. That is, it is possible to identify the distracted driving such as operating the smartphone in the inattentive driving situation. In addition, a processing load can be significantly reduced by appropriately adjusting the image capturing timings and the processing timings of the first image capturing unit and the second image capturing unit. Accordingly, it is possible to reduce the heat generation and the increase in power consumption of the control device, and to reduce resource consumption of the control device.

The present application is based on a Japanese patent application (No. 2022-202280) filed on Dec. 19, 2022, the contents of which are incorporated herein by reference.

REFERENCE SIGNS LIST

10A: first camera
10B: second camera
20: main control unit
21, 22: feature detection function
23: timing control function
24: monitoring function unit
24*a*: inattention detection function
24*b*: drowsiness detection function
24*c*: posture collapse detection function
24*d*: action detection function
24*e*: posture detection function

24*f*: seat belt detection function
24*g*: steering wheel holding detection function
25: alarm function
26: history information recording function
50, 50A, 50B: driver
51: steering wheel
52: seat belt
100: driver monitoring device
A1, A2: image capturing range
i1, i2: captured image

The invention claimed is:

1. A driver monitoring device comprising:

a first image capturing unit configured to be capable of capturing an image of a driver of a vehicle and surroundings of the driver;

a second image capturing unit having an image capturing field of view range narrower than an image capturing field of view range of the first image capturing unit and configured to be capable of capturing an image of a feature appearing on a face of the driver;

a control unit configured to control image capturing timings of the first image capturing unit and the second image capturing unit; and a determination unit configured to determine whether the driver is performing an operation unrelated to a driving operation based on the images acquired from the first image capturing unit and the second image capturing unit, wherein:

the control unit is configured to, responsive to the determination unit detecting that the driver is inattentive based on the image input from the second image capturing unit in a state in which an input from the first image capturing unit is stopped, cause the first image capturing unit to start acquiring the image, and the determination unit is configured to, after the control unit causes the first image capturing unit to start acquiring the image responsive to detecting that the driver is inattentive based on the image input from the second image capturing unit in a state in which an input from the first image capturing unit is stopped, determine whether a detection target or a posture of the driver to be detected is included in the image acquired from the first image capturing unit.

2. The driver monitoring device according to claim 1, wherein the determination unit detects a mobile terminal present in a region in a vicinity of the driver based on the image captured by the first image capturing unit.

3. The driver monitoring device according to claim 1, wherein the determination unit detects at least one of an orientation of the face and a direction of a line of sight of the driver based on the image captured by the second image capturing unit.

4. The driver monitoring device according to claim 1, wherein the determination unit detects at least one of an orientation of the face and a direction of a line of sight of the driver based on the image captured by the second image capturing unit, and determines that the driver is inattentive when the detected orientation of the face or direction of the line of sight is within a range of an inattention condition for a certain time or more.

* * * * *